No. 825,762. PATENTED JULY 10, 1906.
D. M. SARKISIAN.
POLE RING.
APPLICATION FILED MAR. 26, 1906.
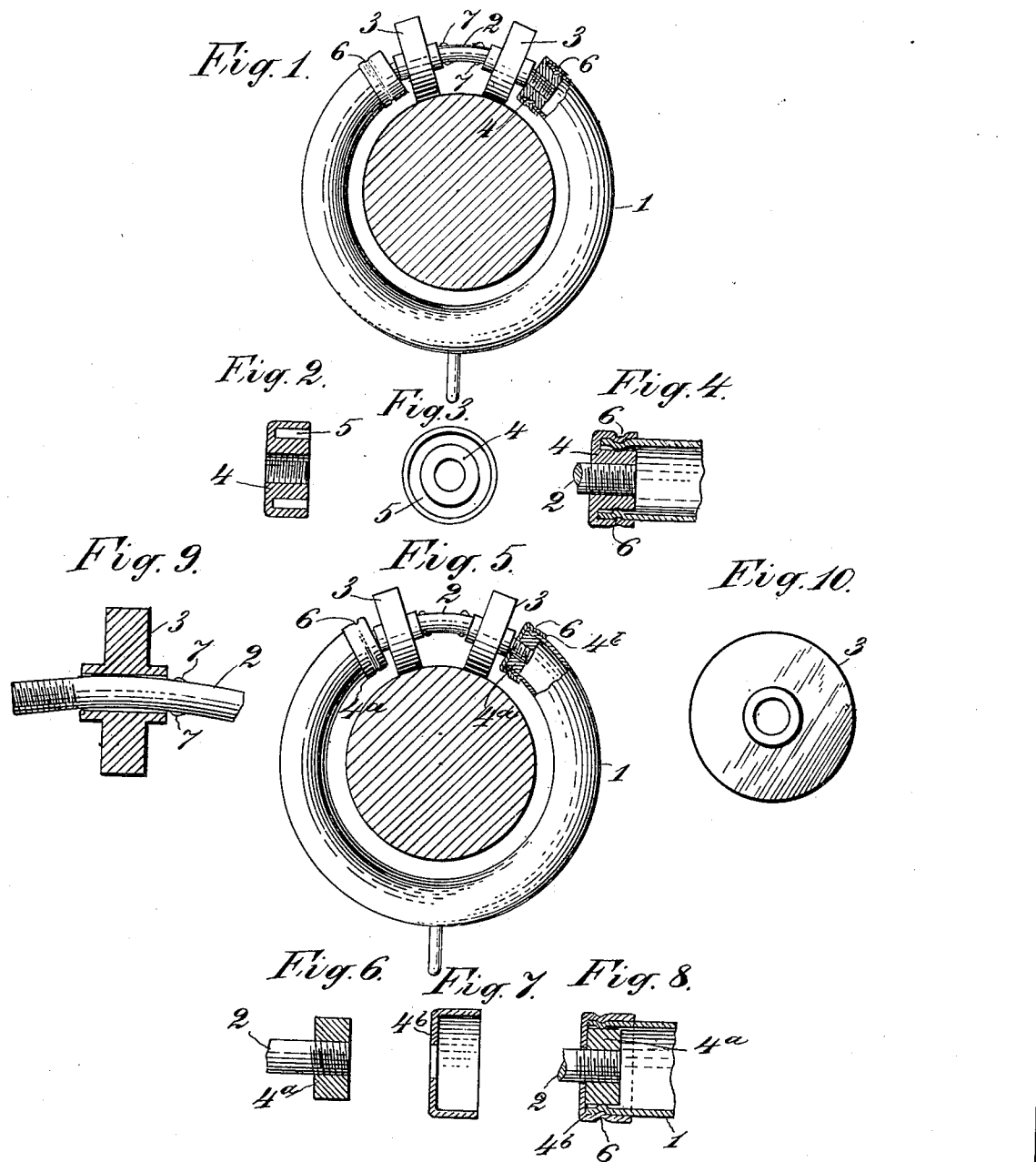

UNITED STATES PATENT OFFICE.

DICKRAN M. SARKISIAN, OF MALDEN, MASSACHUSETTS.

POLE-RING.

No. 825,762.

Specification of Letters Patent.

Patented July 10, 1906.

Application filed March 26, 1906. Serial No. 308,063.

*To all whom it may concern:*

Be it known that I, DICKRAN M. SARKISIAN, a citizen of the United States, residing in Malden, Middlesex county, Massachusetts, have invented certain new and useful Improvements in Pole-Rings, of which the following is a specification.

This invention relates to the class of rings used on curtain-poles, or poles used for portières and the like, to support the curtain or portière, and particularly to such rings when provided with rollers to roll on the pole, and thus reduce the friction; and the main object of the invention is to provide an improved mounting for the rollers on the rings, as will be hereinafter described with reference to the accompanying drawings.

In said drawings, Figure 1 is a side elevation of a ring embodying the invention, the ring being partly in section in order to illustrate the construction. Figs. 2, 3, and 4 are detail views on a larger scale. Figs. 5, 6, 7, and 8 are similar views to the first four figures, illustrating a slightly-modified form of the invention. Figs. 9 and 10 are enlarged views of one of the rollers and its journal.

Referring to the first four figures of the drawings, 1 designates the main body or section of the tubular ring, constituting about three-fourths of a complete circle, the remainder being made up of a section formed of thick wire 2, upon which are rotatively mounted the wheels 3.

The novel features of the present invention reside mainly in the means for securing the ends of the solid section 2 in the open ends of the main hollow section or portion 1 of the ring. On the end of the wire 2 is screwed a disk nut 4, of which Fig. 2 is a diametrical section and Fig. 3 a face view. This disk nut has in its face a deep groove 5 to receive the end of the tubular section 1, and when the said nut and tubular section are fitted together they are secured to each other by a circumferential indentation 6, seen best, perhaps, in the sectional detail view, Fig. 4. This view shows how, in forming the indentation, the metal of the parts is so pressed in as to form a secure fastening.

The construction of Figs. 5 to 8 is substantially the same as that described, differing only in the attaching device or nut. Instead of being grooved to receive the end of the tubular part 1, this nut is made in two parts—namely, the nut proper, $4^a$, which fits snugly inside the tubular part 1, and a cap $4^b$, which fits over the latter. In Fig. 6 the nut $4^a$ is seen in section, in Fig. 7 the cap $4^b$ is seen in section, and in Fig. 8 the parts are seen in section, assembled, and secured together by a circumferential indentation 6.

It may be explained that the wheels 3 turn loosely or freely on the solid section or journal 2, being slipped onto the respective ends of the latter before it is mounted in the ring 1. To prevent the wheels from sliding along the section 2, the latter may have projections 7, set up with a punch. Fig. 9 shows the wheel 3 in diametrical section, and Fig. 10 shows the same in side elevation, detached. It will be noted that the means or device for securing the solid section 2 to the hollow section 1 is practically the same in Figs. 4 and 8. The only difference is that in Fig. 4 the parts are integral and in Fig. 8 they are not. In both, however, there is a cylindrical groove or recess to receive the end of the tube forming the section 1 of the ring, and a circumferential clench 6 to secure together the tubular section 1 and the securing device for the solid section 2 of the ring. This construction provides a solid journal for the bearing-wheels 3 to rotate on. Obviously the ends of the solid section 2 of the ring might be secured in the attaching part by other means than screw-threads, but this mode of securing the attaching device is preferred.

Having thus described my invention, I claim—

1. A device for the purpose specified, comprising a ring composed of a single hollow part or section 1, and a single solid section 2, which completes the ring, two rollers 3 on said solid section, and means for rigidly securing the respective ends of the solid section to those of the hollow section, said means comprising an end piece which is screwed onto the solid section 2, embraces both externally and internally the end of the hollow section 1, and is secured thereto, substantially as set forth.

2. A device for the purpose specified, comprising a ring composed of a major hollow section 1, a solid section 2, and attaching devices screwed onto the respective ends of the section 2, said attaching devices having each a cylindrical groove engaged by the end of the section 1, wherein it is secured by clenching, and rollers on said part 2.

3. A device for the purpose specified, consisting of a ring composed of a tubular portion or section 1, two attaching devices 4, having in each a recess which receives the end of the tubular section 1, and a circumferential indentation 6 which secures the parts together, and a solid part or section 2 secured at its respective ends in the said attaching devices, and rollers on said section 2.

In witness whereof I have hereunto signed my name, this 22d day of March, 1906, in the presence of two subscribing witnesses.

DICKRAN M. SARKISIAN.

Witnesses:
JOSEPH H. LEWIS,
GEO. N. DOMEY.